United States Patent [19]

Oseroff et al.

[11] 3,950,838
[45] Apr. 20, 1976

[54] PROCESS FOR MANUFACTURE OF GRIPS FOR HAND POWERED AND HAND GUIDED EQUIPMENT

[76] Inventors: Herbert B. Oseroff, 9800 Bay Harbor Drive, Bay Harbor Islands, Fla. 33154; William J. Sparks, 5129 Granada Blvd., Coral Gables, Fla. 33146

[22] Filed: June 3, 1974

[21] Appl. No.: 475,387

Related U.S. Application Data

[63] Continuation-in-part of Ser. No. 329,944, Feb. 5, 1973, Pat. No. 3,848,480.

[30] Foreign Application Priority Data
Feb. 1, 1974 Canada............................ 191579

[52] U.S. Cl.................................. 29/407; 74/558.5
[51] Int. Cl.²...................................... B23Q 17/00
[58] Field of Search................. 117/47 A, 139, 162; 260/33.6 A; 29/407; 273/81 R, 75; 74/558.5

[56] References Cited
UNITED STATES PATENTS

| | | | |
|---|---|---|---|
| 2,650,174 | 8/1953 | Carson | 117/139 |
| 2,739,954 | 3/1956 | Fryling | 260/33.6 |
| 2,866,731 | 12/1958 | VanEpp | 117/162 |
| 2,901,448 | 8/1959 | Kraus | 260/33.6 |
| 3,351,572 | 11/1967 | Jameson | 260/33.6 |
| 3,519,585 | 7/1970 | Miller | 260/33.6 |
| 3,533,982 | 10/1970 | Schmidt et al. | 260/33.6 |
| 3,638,295 | 2/1972 | Sparks | 29/407 |
| 3,792,005 | 2/1974 | Harlan | 260/33.6 |

Primary Examiner—Ronald H. Smith
Assistant Examiner—Sadie L. Childs
Attorney, Agent, or Firm—Meredith P. Sparks

[57] ABSTRACT

A process for making improved grips for encircling the hand contact portion of a shaft, lever, or steering device for hand powered and hand guided equipment from a reversible thermoplastic rubber. A simple test characterizes the thermoplastic rubber compositions as "xylenophyllic" materials, useful for forming grips by coating processes and for uses requiring less environmental stability, and "xylenophobic" materials, useful for grips requiring high environmental stability. The improved grips find application whenever it is desirable that the hand grip be securely grasped and held, and especially for use wherever hand injury or discomfort may occur due to vibration or shock.

10 Claims, 6 Drawing Figures

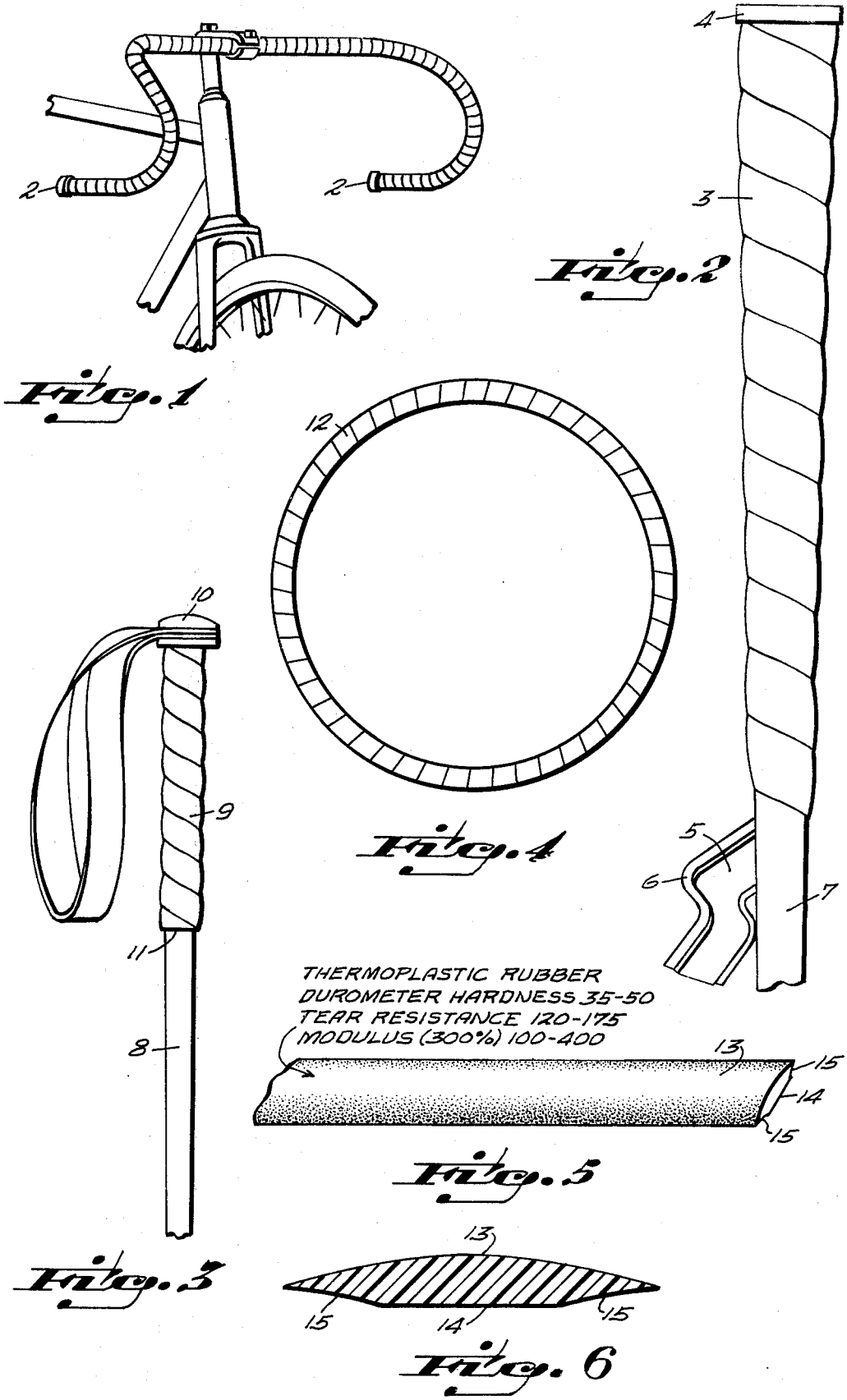

PROCESS FOR MANUFACTURE OF GRIPS FOR HAND POWERED AND HAND GUIDED EQUIPMENT

RELATED APPLICATIONS

This application is a continuation-in-part of earlier related U.S. application, Ser. No. 329,944, filed Feb. 5, 1973 for Hand Grips.

BRIEF SUMMARY OF INVENTION

This invention relates to a process for making improved grips for encircling the hand contact area of a shaft, lever, or steering device for hand powered and hand quided equipment. More particularly, this invention relates to grips for hand operated devices of this kind which are made from a reversible thermoplastic rubber material which has good physical properties without requiring vulcanization. This invention relates especially to grips which are formed by winding extruded tapes of this thermoplastic material spirally on the shaft, lever or steering device, but also includes grips which are made by molding processes and by solvent coating methods.

DETAILED DESCRIPTION

Hand powered implements and hand guided equipment are often controlled by direct manual contact of the hand with an operating shaft, lever or wheel. The grips of this invention encircle at least a portion of the hand operated device for control of hand powered or hand operated equipment in which the handle portion of the device may be of any shape, including a shaft or bar which is straight, tapered or curved, and including steering wheels which form an annular ring. It also includes instances where the manual control area is covered by a superimposed layer of a thermoplastic rubber material having a different composition from an existing grip.

The grips are particularly useful for guiding wheels for boats or other motor powered equipment; on the hand power rim or lever for a wheel chair or other hand powered or steered medical device; and for the steering levers for outboard motors. The grips are also useful for encircling the manual control area of equipment such as clubs, racquets and the like used in various sports and games such as golf, tennis, table tennis, baseball, field hockey, ice hockey, lacross and squash; for fishing poles, ski poles and the like; and for tools such as a hatchet, hammer, broom, or policeman's billy club, which implements are used to transmit power through a shaft to an operating head. The improved grip finds application whenever it is desirable that the hand grip be securely grasped and held, and especially when the impact of a ball with a club or racquet, for example, is with sufficient force that it may cause blisters of callouses on the hand. Another important application is on the handlebars of bicycles and motorcycles, and for auto steering wheels where the hands may be subjected to road shock.

Grips formed by spirally winding the handle bars of bicycles or motorcycles with tapes made of the reversible thermoplastic rubber are especially desirable for comfortable cycling without numbness to the hands on long trips. It is well known that numbness of the hands and fingers is almost an invariable result of long distance cycling. This results from the fact that nerves lying in close proximity to the hand bones of the bicyclist are being compressed by constant pressure from the handle bars. This in turn is greatly aggravated by the additional compression caused by sudden transmitted rock shock. Permanent nerve damage sometimes results.

Several types of reversible thermoplastic rubbers which do not require vulcanization to develop elastomeric properties are now sold commercially as is discussed more fully below. Other chemical types may be developed. However, this invention for making grips for hand operated and hand powered equipment is not limited by the chemical composition of the thermoplastic rubber, but by its physical properties which are specifically defined.

An important type of thermoplastic rubber for use in making grips are the block copolymers. Typically, these block copolymers comprise three blocks in the configuration A–B–A, where A represents an amorphous polymer which has a glass transition temperature above room temperature, i.e. a thermoplastic, and B represents an amorphous polymer which has a glass transition temperature well below room temperature, i.e. a rubber. Thus the polymers contain units which have an elastomeric block in the center and a thermoplastic block on each end. Where the thermoplastic end-blocks are in minor proportion, they associate together to form discrete particles. These particles act as cross-links for the elastomeric center-blocks. The resulting network is thus held together by reversible physical bonds in contrast with the permanent chemical bonds found in vulcanized elastomers. Since the thermoplastic end-blocks and the elastomeric mid-blocks are mutually incompatible, the bulk polymer separates into two micro-phase regions. Where the end-blocks are in minor proportion, they coalesce, when cooled from a melt, to form sub-microscopic particles of thermoplastic material. These particles, held together by van der Waals forces, form a discrete phase while the elastomeric mid-blocks form a continuous phase. Block copolymers derive their strength from physical cross-links rather than chemical cross-links and, therefore, the vulcanizing step is not required.

Block copolymers are available in commerce where block A represents a polystyrene chain and block B represents an elastomer (rubber) chain, such as polybutadiene or polyisoprene. Polystyrene is not compatible with the polydiene and the polystyrene end-blocks try to separate from the rubber midblocks, but are limited in doing so by being chemically fastened together. They can only move far enough away to form minute discrete regions of polystyrene (termed "domains") within a continuous rubber network.

Another type of thermoplastic rubber material which is commercially available for use without vulcanization to develop elastomeric properties includes certain blends of partially cured monoolefin copolymer rubber, such as EPM (ethylene-propylene copolymer rubber) or EPDM (ethylene-propylene non-conjugated diene terpolymer rubber) with a polyolefin resin such as polypropylene. In this instance a partial cure of the rubber is effected by heating the rubber with a curing agent, usually a peroxide. These blends also have the characteristics of thermoplastic elastomers and likewise have good physical properties without requiring vulcanization.

Thus certain marginally functional hydrocarbon copolymers may be marginally cured so as to have the characteristics of thermoplastic rubbers in that they are reprocessable and reusable, and can be molded or extruded to give good properties without vulcanization. For example, Butyl rubber reclaim shows these characteristics when the product is so little cross-linked that it is still processable. Butyl rubber refers to vulcanizable hydrocarbon polymers of low unsaturation made by copolymerization of a large proportion of olefin (isobutylene) with a small proportion of diolefin (isoprene, for example). Because of the low unsaturation, Butyl reclaim possesses high resistance to oxidative aging and ozone.

We recognize that hard brittle substances such as plastics and sometimes highly vulcanized rubber can sometimes be plasticized excessively so as to produce a rubbery type of material, but we specifically exclude these overplasticized materials, and particularly polyvinyl chloride plastics from this application.

By definition (ASTM D883) a plastic is a material that contains as an essential ingredient an organic substance of large molecular weight, is solid in its finished state, and at some stage in its manufacture or in its processing into finished articles, can be shaped by flow. By definition (ASTM D1566) an elastomer is a macromolecular material that returns quickly to approximately the initial dimensions and shape after substantial deformation by a weak stress and release of stress.

Hardness and "feel" are important physical properties for grips. A most important physical contact between man and the outside world is through the human hand. Feed is the sensitivity factor through which individuals vary greatly in manual dexterity. Feel, which is so important in arts, crafts and sports, is therefore, a matching of the force-transmitting layers of the hands with force-accepting layers of outside objects. There is a range of maximum manual and tactile sensitivity. Using the Shore A durometer hardness test, the optimum hardness from a force accepting standpoint is from about 35 to about 65 Shore A hardness, as determined by ASTM standard D2240-68. A test for hardness under the International Standard is ASTM D-1415. In some instances thermoplastic rubbers having an initial Shore A hardness greater then 65 can be converted to a Shore A hardness below that amount while retaining the needed properties specified for modulus and tear resistance by the use of additives, or by foaming.

Grips, or the tapes to be used in forming grips, can be foamed in various ways, as is known in the art, for example, by use of a decomposable solid material, or by pressurizing with air or other gaseous material. In the case of polystyrene-type polymers, the use of a gas progenitor such as is used for polystyrene foam materials may be a preferred method.

In addition to hardness, the grip must have tear resistance and strength, especially when the grip is formed by tapes which are spirally wound. Since the tapes are often sold separately and applied to a bicycle handle bar, for example, which in usage may have rough treatment due to falls and scrapes that cause nicks and tears in the tapes, the grip material must have good tear resistance. Tear resistance is important during winding the tape on the handle bar since tear resistance is affected by mechanical handling of the rubber, speed of stretching and other operations to which the tapes may be subjected. Tearing takes place at a flaw. Therefore, tear resistence is greater when there are no flaws. Tear resistance is measured according to ASTM standard D624-70 which covers methods using three independent specimen shapes, two of which are razor-nicked before testing. Thermoplastic rubber suitable for this invention will show tear resistance values of about 120 to about 175 pounds pull in the ASTM test method.

The rubber material used for the grip must also have strength, which property is related to the modulus figures obtained following the procedures of ASTM standard D2433-70 where the elongation at break of a rubber thread of the material is determined. The stress at predetermined elongation is determined in pounds per square inch calculated on the original cross-sectional area at a specified elongation measured on extension and retraction of a massaged thread. Thermoplastic rubber suitable for the grips of this invention will show value of at least 100 and up to about 600 or perhaps even more at 300% elongation.

The following Table shows the hardness, tear resistance and modulus of several thermoplastic rubbers sold commercially which have physical properties within the above specified ranges.

| SAMPLE | Shore A HARDNESS | TEAR RESISTANCE | 300% MODULUS, psi |
|---|---|---|---|
| A | 37 | 120 | 100 |
| B | 38 | 115 | 275 |
| C | 43 | 170 | 200 |
| D | 44 | 175 | 250 |

The thermoplastic rubbers for making the grips of this invention are compatible with a wide variety of resins, polymers, plasticizers and other ingredients. The properties of these mixtures, such as tack, stiffness, softening temperature or cohesive strength, may be varied over wide ranges. With block copolymers there are two phases which can interact with additives. Thus an equilibrium will be established among the additive, the rubber network and the thermoplastic domains. Even though thermoplastic rubbers are ordinarily two-phase systems, they are inherently transparent rubbers. Additives which are matched in refractive index and which do not form agglomerates greater than about $10^{-5}$ cm in the longest dimension do not seriously affect the clarity of composites. Dyes and pigments can be used to obtain a variety of colors in a known manner.

Although in some instances the thermoplastic rubber initially may have one or more physical properties falling outside the range indicated, the rubber may be compounded so as to give a thermoplastic composition which falls within the range of these special properties. However, this invention does not include materials such as compositions made from polyvinyl chloride, which is not itself a thermoplastic rubber.

Not all uses for hand grips require exceptional weathering properties, and not all types of thermoplastic rubbers are subject to a substantial degree of degradation on being exposed to the weather. Some thermoplastic rubbers are inherently resistant to degradation by heat, ozone, and UV radiation, or they can be compounded with many kinds of known commercial stabilizers, such as Irganox 1010, Epon 1002, Terro Am 340 and Tinuvin 327 to provide additional melt-processing protection, or to produce thermally stable, ozone resistant and weather resistant grips for outdoor use. However, some types of thermoplastic rubbers do not produce grips which will have dependable environmental stability for some uses, with or without stabilizers. Therefore, in order to avoid rejects of some of the grips in service, it was necessary to find some method of predicting the environmental stability of a particular lot of thermoplastic rubber prior to making the grips.

It has now been found that a very useful and reliable correlation exists between the environmental stability of the grip in service and the solvent resistance of the thermoplastic rubber from which it is made. The test described in Example 1 has been devised for evaluation in a very practical way the suitability of a test specimen of thermoplastic rubber for use in making grips.

EXAMPLE 1

A tape made by extruding the thermoplastic material to be tested, and having a thickness of about 100 mils, is wrapped around a mandrel about ½ to 1 inch in diameter. The material is then tested by allowing one or two drops of xylene to fall upon the upper surface. A "xylenophyllic" material will break down almost immediately and separate into two parts, whereas a "xylenophobic" material will remain intact even though the rubber may show some swelling.

Other tests for solvent resistance might be devised, for example, by substituting related solvents such as toluene, benzene or other solvents for xylene and altering the conditions somewhat. However, it is to be noted that the above test is based not only on the inherent solubility of xylene for the rubber material, but also by the rate of evaporation of the solvent and the torsion properties when wrapped around the mandrel. That is to say one or two drops of the solvent must cause a break in the tape before the solvent evaporates under the conditions of application.

Without being limited to any theory of action, there appears to be a correspondence between the amount of unsaturation present in the chemical structure of some thermoplastic rubbers and the weathering properties with respect to sunlight, ozone and other elements which cause the rubber to crack. Likewise there appears to be a correspondence between the amount of unsaturation present in some thermoplastic rubbers and the solvent resistance. Thus, the solvent resistance of the rubber to a solvent such as xylene may suggest unsaturation, which in turn predicts the environmental stability. The cut-off point for practical use comes when the tape breaks. For example, grips made from tape wrapped with a certain amount of tension around the handle bar of a bicycle are especially sensitive to weather conditions, and when the tape breaks, the entire grip needs to be rewound or changed. Determination of the solvent resistance of the thermoplastic rubber using the test method described has been found to correlate well with the potential behavior of the tape made from the rubber when subjected to practical use.

The "xylenophyllic" thermoplastic rubbers which break under the test employed, are useful not only for coating processes where they easily form solutions with the appropriate solvents as is more fully discussed below, but are many times preferred for grips in molded and tape form which require less environmental stability, or which are subjected to fewer strains in use, because of an improved "feel" or other quality. It has been found, for example, that tape of a "xylenophyllic" thermoplastic rubber spirally wound around an automobile steering wheel to make a grip, will be stable for a period of a year or more without cracking or breaking, even when the car is frequently exposed to parking in the sun. Here the grasp of the hand kneads the grip from time to time, supposedly removing strains which could be present, and the sunlight is filtered through the windshield.

DESCRIPTION OF DRAWING

A fuller understanding of the grips made from tapes may be had by referring to the following description and claims taken in conjunction with the accompanying drawings.

FIG. 1 is a perspective view showing the handle bar of a bicycle on which a grip is formed by winding a tape made of the thermoplastic rubber of FIG. 5, the tape being fastened at each end.

FIG. 2 is an elevational view of the top portion of a tapered shaft, such as a golf club, on which the grip is formed by spiral winding of a tape of the thermoplastic rubber of FIG. 5.

FIG. 3 is an elevation view of a grip encircling a straight shaft which forms the top of a pole, the grip being formed by spiral winding of a tape of the thermoplastic rubber of FIG. 5.

FIG. 4 is a top plan view of a steering wheel rim in which the grip is formed by spiral winding of a tape of the thermoplastic rubber of FIG. 5. The rim is mounted upon the steering post by means of spokes in a known manner. The winding on the wheel may be omitted at the places where such attachment is effected.

FIG. 5 is a perspective view of a tape made of thermoplastic rubber having the specifications defined in this invention, one end of the tape being broken away.

FIG. 6 is a cross-sectional view of the tape of FIG. 5.

As shown in FIG. 1 the tape is spirally wound around the entire handle bar and secured at each end with a fastening means 2. On the handle bar of the bicycle space may be provided between adjacent spiral windings of the tape for the attachment of additional equipment, such as brakes on the handle bar.

In FIG. 2 the tapered shaft is spirally wound with a tape 3 which is secured at the top with a cap 4. The underside 5 of the tape is shown at the lower end of the shaft to illustrate a beveled edge 6 which is provided for overlapping of adjacent strips of the tape when spirally wound around the shaft 7.

In FIG. 3 a straight shaft 8 is spirally wound with a tape 9 which is fastened at the top with a cap 10 and secured at the lower end by suitable means 11.

In FIG. 4 a wheel rim which may be used, for example, as an automobile steering wheel or for guiding a boat, is wound with tape 12. Spaces may occur between adjacent spiral windings of the tape for spokes and the like attached to the rim of the wheel.

FIG. 5 is a perspective view of a tape made of thermoplastic rubber having the specifications defined in this invention.

FIG. 6 is a cross-sectional view of the tape of FIG. 5 which has a generally rounded curvature at the top 13, a flat bottom 14, and angular cuts 15 at each side so as to permit overlapping of adjacent strips of the tape without substantially increasing the thickness of the overlapped portion.

The grips may also be extruded in the form of a tube which can be used as a slip-on-grip, or flattened to make a double-thickness tape for winding.

The tape used may be of any suitable dimension, taking in consideration the size of the object, its curvature, interruptions, and the like. Tapes generally vary in size from about 1–3 centimeters wide and from about 1 to 5 millimeters in thickness. Tapes sold for bicycle grips are preferably about 2 centimeters wide and about 2–3 millimeters thick. Preferably each edge of the tape is beveled lengthwise, as shown in FIG. 2 and FIG. 5 for a distance of about 0.5 to 3 millimeters from each edge, to provide for overlapping of adjacent strips when the tape is wound around the handle bar.

The grip may also be molded to any suitable size and shape to fit on the handle bar, shaft, or steering mechanism. A molded grip is usually not practical when the hand operated device is curved, bent or interrupted by cross bars, brakes or other mechanisms. A molded slip-on grip will save labor, because it is slipped on, and not wound on. Sheath grips also take less time and skill to apply. However, in a golf club, for example, a slip-on grip will yield or "give", however slightly, at the high speed impact of club on the ball. But if the grip is made of tape which has been spirally wound under tension, it cannot be twisted the same way. It is unyielding and, therefore, transmits a completely solid hit. Many persons prefer a spirally wound grip for this reason.

An important advantage in the use of certain "xyleneophyllic" thermoplastic rubbers for hand grips lies in the fact that the rubbers are solution processable and, since they are low in molecular weight, produce solutions with low viscosity but with very high solids content relative to other types of rubbers. The high solids content permits rapid formation of a relatively thick coating per dip when an object is dipped into such a solution. Viscosity, as well as other properties, can be adjusted by the choice of solvent or solvent blend. These solutions may be applied to an existing grip by standard coating, spraying, brushing, or troweling techniques. This is a very suprising phenomena for rubber materials, and makes it possible to form a soft rubber overlay of relatively uniform thickness on an existing grip which is thick enough to have the desired "feel" without being too thick so that "squirmishness" results. A certain minimum thickness of the coating is required in order that the grip has the soft "feel". As indicated by the Shore A durometer to determine hardness, a minimum thickness is needed in order that the needle of the durometer will not penetrate to a point where the reading reflects not only the hardness of the coating, but also the hardness of the shaft itself, or of any harder grip material present as an underlay. But most important, a soft grip coating results that has soft "feel" without being so thick as to have "squirmishness", a word which some experts in the field have used to describe a real or fancied uncertainty which they sometimes experience when a soft, thick grip is used in games such as golf which require precision on striking a ball. The phenomena could better be treated as rotational stability, which is defined by the two parameters of distance (radius segment, or thickness of the grip) and softness. The greater the radius and the softer the material, the greater the rotational instability. Thus, some people would find a thick grip having 60 Shore A hardness (harder than the hand) too rotationally unstable for their satisfaction, even though it feels "hard" to the hand, especially when serrated; yet these same people would find a thin grip of 35 Shore A hardness (approximately the same hardness of the hand) satisfactory with respect to squirmishness.

Thermoplastic rubbers can be dissolved in single solvents such as toluene or in solvent blends such as a mixture of hexane and methyl ethyl ketone. In comparison to most other polymers, the important difference is that because of the two-phase nature of the block copolymers the solvent system must be capable of solvating both phases—polystyrene and rubber. There is a variety of inexpensive hydrocarbon solvents which, when used alone, will meet this requirement. Solvents useful for this purpose include hydrocarbons, chlorinated hydrocarbons, ketones, esters and alcohols. The solvent suitable for the thermoplastic rubber needs to be one which will dissolve both the polystyrene domains and the rubber network. Dissolving the polystyrene domain unlocks the network, permitting mixing and application of the mix. If blends of solvents are used, an even wider variety of solvent types may be considered. Physical properties of films cast from solutions of thermoplastic rubbers and mixed solvent systems will be affected by the choice of solvents.

Toluene is the most frequently used solvent because it dissolves both phases of the thermoplastic rubber. In films cast from toluene and dried at slow evaporation rates at room temperature, the domain structure is also considered to be nearly ideal and very close to the domain structure resulting from slowly cooled melts. A solution containing a solids content of about 30–40% of a block polystyrene-polybutadiene thermoplastic rubber in toluene forms a solution from which a grip of the same material can be dipped, holding in the solution for about one minute, to cast a coating of about 0.1 to about 0.5 mm thick after air drying at room temperature, which coating will meet applicants' specifications herein defined. It is not necessary that the thermoplastic rubber used in solution for the overlay be of the identical material as the grip element which is dipped. In order to assure firm adherence of the coating, the underlayer needs only to be of a material which is somewhat affected by the solvent during the time allowed for dipping. Since the solvent used for the coating must be one which dissolves each component of the two-phase system, namely the thermoplastic and the rubber, the solvent will likewise have some solvent action on a grip underlay which is made of a thermoplastic, rubber, or other thermoplastic rubber material.

The dipping procedure is to first soak the rubber or plastic grip in a solvent such as xylene; then dip it in the coating solution for a time interval of about 10 seconds to 10 minutes, sufficient to form an adherent coating, and then remove and dry, exposed to the air, for several hours. If it is desirable to coat several times, the drying period for the primary coats may be reduced to as little as 15–20 seconds.

Coating from a solution is particularly useful in the case of a grip element which has finger locating sections in which the desirable grip is obtained by placing the fingers in the spaces provided on the surface of the grip. If such a grip has been formed initially by spiral winding of a tape on a shaft, adjacent convolutions are sealed together by the coating and a smooth outer surface is obtained which is easily cleaned. Coating also improves the tear resistance since flaws such as nicks and cuts are sealed.

Various modifications and variations of the present invention may be made without departing from the spirit of the discovery or the scope of the appended claims.

We claim:

1. A process for making a grip for the hand control area of a hand operated device for hand powered and hand guided equipment which comprises the steps of
   a. selecting as grip material a reversible thermoplastic rubber composition which has the properties:

1. Shore A hardness in the range of about 35 to about 65, as determined by ASTM standard D2240-68;
2. Tear resistance of about 120 to about 175 pounds pull, as determined by ASTM standard D624-70; and
3. Modulus at 300% elongation in the range of about 100 to about 600 pounds per square inch pull, as determined by ASTM standard D2433-70;

b. subjecting said selected composition of step (a) to a test for solvent resistance which is correlated with the environmental stability of said grip in service,
1. the compositions having high solvent resistance being useful for grips which in use require high environmental stability; and
2. the compositions having little or no solvent resistance being useful for grips which in use require less environmental stability, and for coatings;

c. manufacturing grips for a particular use only from a composition having the environmental stability required for that particular use, as determined by the test of step (b); and d. installing said grip on said hand operated device.

2. The process of claim 1 wherein the solvent resistance of said thermoplastic rubber in step (b) is determined by adding one drop of xylene to a tape of the material having a thickness of about 100 mils which is wrapped around a mandrel about ½ to 1 inch in diameter, and noting whether the rubber breaks down and separates into two parts within about 2 minutes.

3. The process of claim 1 wherein said composition in step b(2) is for use in manufacturing grips for coating processes.

4. The process of claim 1 wherein said composition in step (c) is molded to form said grips.

5. The process of claim 1 wherein said composition in step (c) is extruded in tube form for making said grips.

6. The process of claim 1 wherein said composition in step (c) is extruded in tape form for spiral winding on a handle for making said grips.

7. The process of claim 6 wherein said handle is the handlebar of a bicycle.

8. The process of claim 1 wherein said thermoplastic rubber is a block copolymer of styrene and a conjugated diene, including said block copolymers which have been subjected to later hydrogenation steps.

9. The process of claim 1 wherein said thermoplastic rubber composition is a blend of a partially cured monoolefin copolymer rubber with a polyolefin resin.

10. The process of claim 1 wherein said thermoplastic rubber is a Butyl rubber reclaim.

* * * * *